United States Patent Office 2,715,143
Patented Aug. 9, 1955

2,715,143

PROCESS FOR THE MANUFACTURE OF TETRA-
LONES SUBSTITUTED IN THE 1-POSITION

Cyril Grob, Basel, Switzerland, assignor to Organon Inc.,
Orange, N. J., a corporation of New Jersey No Drawing. Application September 23, 1949,
Serial No. 117,486

Claims priority, application Netherlands October 2, 1948

4 Claims. (Cl. 260—590)

The invention relates to a process for the manufacture of tetralones substituted in the 1 position.

In my co-pending patent application No. 117,485, now Patent No. 2,632,024, a process is described for the preparation of 5.8-disubstituted tetralone-2. The oxygen atom in the first nucleus therein is in the position β (i. e. position 2) with respect to the second nucleus. The present invention relates to the introduction of an alkyl group into the 1 position (i. e. position α) with respect to the second nucleus.

The ordinary alkylating methods fail completely. In general no result at all is obtained. When the method is followed described by J. W. Cornforth and R. Robinson (J. Chem. Soc. 1946, 676) for the methylation of methoxy-5 tetralone-2 probably a final product is obtained in which two methyl groups have been introduced; in any case this method does not lead to the introduction of one methyl group into the position 1.

I have found that the use of finely divided alkali metal in an indifferent solvent leads to the desired result. The 5.8 disubstituted tetralone-2 is for this purpose brought together with finely divided alkali metal in an indifferent solvent, whereupon alkylhalide is added. The following embodiment relates to the introduction of a methyl group in the 1 position into dimethoxy-5.8 tetralone-2 but the method according to the invention can also advantageously be applied when introducing other alkyl groups than the methyl group into the position 1 in a 5.8 disubstituted tetralone-2.

*Example*

390 mg. of potassium (1.1 mol.) are pulverized in xylene. The xylene is poured off and replaced by 20 cm.³ of absolute benzene. Under elimination of moisture and in a stream of dry nitrogen 1.92 g. of dimethoxy-5.8 tetralone-2 (M. P. 96–98° C.) are added. The substance dissolves immediately under the evolution of hydrogen. After having been slightly refluxed for 40 min. a greywhite precipitate is formed. One adds 2.0 cm.³ of methyliodide, boils 30 min., cools and allows the mixture to stay overnight. A brown precipitate is formed. After 2 N sulfuric acid having been added the benzene is evaporated in vacuo, the red brown oily mass is dissolved in some water and extracted three times with ether. The ether solution is worked up in the usual manner (shaking out with soda gives a dark color). A ruddy movable oil remains (2.2 g.). The purification is performed by distillation in a vacuum. The yield of methyl-1 dimethoxy-5.8 tetralone-2 is 90%. It is an important intermediate product in the synthesis of steroids. The substance does not form a bisulfite compound. The semicarbazone melts at 165–167° C.

When the metal sodium is substituted for potassium a yield of 77% is obtained.

Having now particularly described and ascertained the nature of my said invention and in what manner same is to be performed what I claim is:

1. A method of producing a tetralone compound substituted in 1-position by an alkyl group, comprising introducing into tetralone-2 substituted in positions 5 and 8 by alkoxy groups, an alkyl group in 1-position by treating an alkali metal reaction product of said 5,8-dialkoxy tetralone-2 in a liquid dispersing agent in which said alkali metal compound is insoluble, with an alkyl halide.

2. In the method of producing alkyl-1-dialkoxy-5,8-tetralone-2, the step comprising reacting an alkali metal compound of dialkoxy-5,8-tetralone-2 with an alkyl halide to replace said alkali metal atom by an alkyl group, said reaction taking place in a liquid dispersing agent in which said alkali metal compound is insoluble.

3. In the method of producing alkyl-1-dialkoxy-5,8-tetralone-2, the steps comprising treating dialkoxy-5,8-tetralone-2 with a finely divided alkali metal in an indifferent solvent in which the reaction product is insoluble, and reacting the resulting alkali metal compound in said dispersing solvent with an alkyl halide to introduce an alkyl group into said alkali metal compound by reaction with said alkali metal.

4. In the method of producing methyl-1-dimethoxy-5,8-tetralone-2, the steps comprising treating dimethoxy-5,8-tetralone-2 with a finely divided alkali metal in an indifferent solvent, in which the reaction product is insoluble, and reacting the resulting alkali metal compound in said dispersing solvent with a methyl halide to introduce a methyl group into said alkali metal compound by reaction with said alkali metal.

References Cited in the file of this patent

UNITED STATES PATENTS 2,271,674   Andersag et al. _____ Feb. 3, 1942

OTHER REFERENCES

Cornforth et al., J. Chem. Soc., 1946 volume, pp. 676–679.

Grob and Jundt, Helv. Chim. Acta, vol 31, pp. 1691–1706, October 15, 1948.

Theilheimer, "Synthetic Methods of Organic Chemistry," vol. II, pp. 239 and 243 (abstracts Nos. 712, 723 and 724). Copyright 1949 by Interscience Publishers, Inc., New York.